US012769912B2

(12) United States Patent
Xie et al.

(10) Patent No.: US 12,769,912 B2
(45) Date of Patent: Oct. 20, 2026

(54) HYBRID SIGNAL ROUTING WITH BACKSIDE INTERCONNECT

(71) Applicant: International Business Machines Corporation, Armonk, NY (US)

(72) Inventors: Ruilong Xie, Niskayuna, NY (US); Mukta Ghate Farooq, Hopewell Jct, NY (US); Albert M. Chu, Nashua, NH (US); Julien Frougier, Albany, NY (US); Kangguo Cheng, Schenectady, NY (US); Chanro Park, Clifton Park, NY (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 18/097,185

(22) Filed: Jan. 13, 2023

(65) Prior Publication Data

US 2024/0242012 A1 Jul. 18, 2024

(51) Int. Cl.

| | |
|---|---|
| ***G06F 30/3308*** | (2020.01) |
| ***G06F 30/327*** | (2020.01) |
| ***G06F 30/392*** | (2020.01) |
| ***G06F 30/394*** | (2020.01) |
| ***G06F 119/18*** | (2020.01) |

(52) U.S. Cl.

CPC ........ *G06F 30/3308* (2020.01); *G06F 30/327* (2020.01); *G06F 30/392* (2020.01); *G06F 30/394* (2020.01); *G06F 2119/18* (2020.01)

(58) Field of Classification Search

CPC .. G06F 30/3308; G06F 30/392; G06F 30/394; G06F 30/327; G06F 2119/18

USPC .......................................................... 716/102

See application file for complete search history.

(56) References Cited

U.S. PATENT DOCUMENTS

| | | | | |
|---|---|---|---|---|
| 7,821,039 | B2 | 10/2010 | Tien | |
| 9,379,042 | B2 | 6/2016 | Park | |
| 9,570,395 | B1 | 2/2017 | Sengupta | |
| 10,290,643 | B1 * | 5/2019 | Kai | H10B 41/27 |
| 10,586,765 | B2 | 3/2020 | Smith | |

(Continued)

FOREIGN PATENT DOCUMENTS

| | | | |
|---|---|---|---|
| JP | 6399887 | B2 | 10/2018 |
| KR | 10-2020-0032224 | A | 3/2020 |

OTHER PUBLICATIONS

Chau Robert et al., "Process and Packaging Innovations for Moore's Law Continuation and Beyond", 2019 IEEE International Electron Devices Meeting (IEDM), Dec. 7-11, 2019, 06 pages, DOI: 10.1109/IEDM19573.2019.8993462.

(Continued)

*Primary Examiner* — Suchin Parihar

(74) *Attorney, Agent, or Firm* — Seed Intellectual Property Law Group LLP

(57) ABSTRACT

An integrated circuit has a frontside and a backside and includes a first CMOS cell of complementary metal oxide semiconductor (CMOS) devices. A first row of gate cuts and a second row of gate cuts bound the first CMOS cell. A gate is associated with at least one of the devices in the first CMOS cell. A first signal line is at the frontside of the integrated circuit. A signal connection is provided from the first signal line to the backside of the integrated circuit. A local interconnect is provided at the backside of the integrated circuit from the signal connection to the gate.

20 Claims, 19 Drawing Sheets

(56) References Cited

U.S. PATENT DOCUMENTS

| | | | | |
|---|---|---|---|---|
| 10,636,739 | B2 | 4/2020 | Beyne | |
| 10,700,207 | B2 | 6/2020 | Chen | |
| 10,734,224 | B2 | 8/2020 | Smith | |
| 10,784,345 | B2 | 9/2020 | Chen | |
| 10,833,078 | B2 | 11/2020 | Smith et al. | |
| 11,043,426 | B2 | 6/2021 | Yang | |
| 11,121,086 | B2 | 9/2021 | Hiblot | |
| 2020/0075574 | A1 | 3/2020 | Smith | |
| 2020/0105671 | A1 | 4/2020 | Lai | |
| 2020/0373240 | A1 | 11/2020 | Vadi | |
| 2021/0358848 | A1 | 11/2021 | Wu | |
| 2021/0375761 | A1 | 12/2021 | Chang | |
| 2022/0050950 | A1* | 2/2022 | Yang | G06F 30/398 |
| 2022/0130761 | A1 | 4/2022 | Kim | |
| 2022/0208757 | A1 | 6/2022 | Do | |
| 2024/0070365 | A1* | 2/2024 | Alptekin | G06F 30/392 |
| 2025/0107229 | A1* | 3/2025 | Miao | H10D 84/0135 |

OTHER PUBLICATIONS

R. Mathur et al., "Buried Bitline for sub-5nm SRAM Design," 2020 IEEE International Electron Devices Meeting (IEDM), San Francisco, CA, USA, 2020, 4 pages, doi: 10.1109/IEDM13553.2020.9372042.

* cited by examiner

HYBRID SIGNAL ROUTING WITH BACKSIDE INTERCONNECT

BACKGROUND

The present invention relates to the electrical, electronic, and computer arts, and more specifically, to layout of very large scale integrated (VLSI) circuits.

In a typical VLSI circuit wafer, billions of complementary metal oxide semiconductor (CMOS) transistors are crowded together in structural layers that are commonly known as the Front End of Line (FEOL) because these are the first layers to be fabricated on the bulk semiconductor substrate. Subsequent layers, known as the Middle of Line (MOL) and Back End of Line (BEOL), contain metal lines (trenches and vias), which interconnect power, ground, and signals among the transistors. In addition to the MOL and BEOL interconnect layers, sometimes a VLSI wafer can be flipped in order to fabricate additional interconnects or other structures at its "backside" (the side of the bulk substrate that is opposite the FEOL layers).

In designing VLSI circuits, a common problem is to determine how to lay out signal lines that will connect all of the transistors to form a logic circuit with minimal electrical losses. There is a known problem of signal line crowding, which is that only a certain number of signal lines can fit within a given "CMOS cell" of CMOS transistors. (A "CMOS cell" of transistors contains a line of transistor gates that are bounded by two lines of gate cuts.) When a CMOS cell of transistors contains a number of gates that exceed the feasible number of signal lines, it becomes difficult to connect signals to the excess gates.

SUMMARY

Principles of the invention provide techniques for hybrid signal routing with backside interconnect.

In one aspect, an exemplary integrated circuit has a frontside and a backside and includes a first CMOS cell of complementary metal oxide semiconductor (CMOS) devices, with a first row of gate cuts and a second row of gate cuts that bound the first CMOS cell; a gate associated with at least one of the devices in the first CMOS cell; a first signal line at the frontside of the integrated circuit; a signal connection from the first signal line to the backside of the integrated circuit; and a local interconnect at the backside of the integrated circuit from the signal connection to the gate.

According to another aspect, an exemplary method for providing a bias signal to a gate that is in a first CMOS cell of a multi-cell CMOS apparatus, from a first signal line that is at the frontside of a second CMOS cell of the multi-cell CMOS apparatus, includes transmitting the bias signal along the first signal line to a gate contact at the frontside of the second CMOS cell; transmitting the bias signal along the gate contact to a first via in the first CMOS cell; transmitting the bias signal through the first via to a local interconnect at the backside of the first CMOS cell; and transmitting the bias signal along the local interconnect to a second via that is in contact with the gate.

According to another aspect, an exemplary method for fabrication of an integrated circuit structure includes forming first and second vias in a first CMOS cell of complementary metal-oxide-semiconductor (CMOS) devices, such that the second via connects to a gate in one of the CMOS devices; forming, at a frontside of the first CMOS cell, a gate contact that bridges from the first via to a second CMOS cell of CMOS devices; and forming, at a backside of the first CMOS cell, a signal line that bridges from the first via to the second via.

According to another aspect, the integrated circuit is instantiated in a hardware description language (HDL) design structure.

In view of the foregoing, techniques of the present invention can provide substantial beneficial technical effects. For example, one or more embodiments provide one or more of:

Routing a bias signal to a gate in a first CMOS cell from a signal line in a second CMOS cell, thereby obviating the problem of signal line crowding in VLSI circuits.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

DETAILED DESCRIPTION

Figure 1:
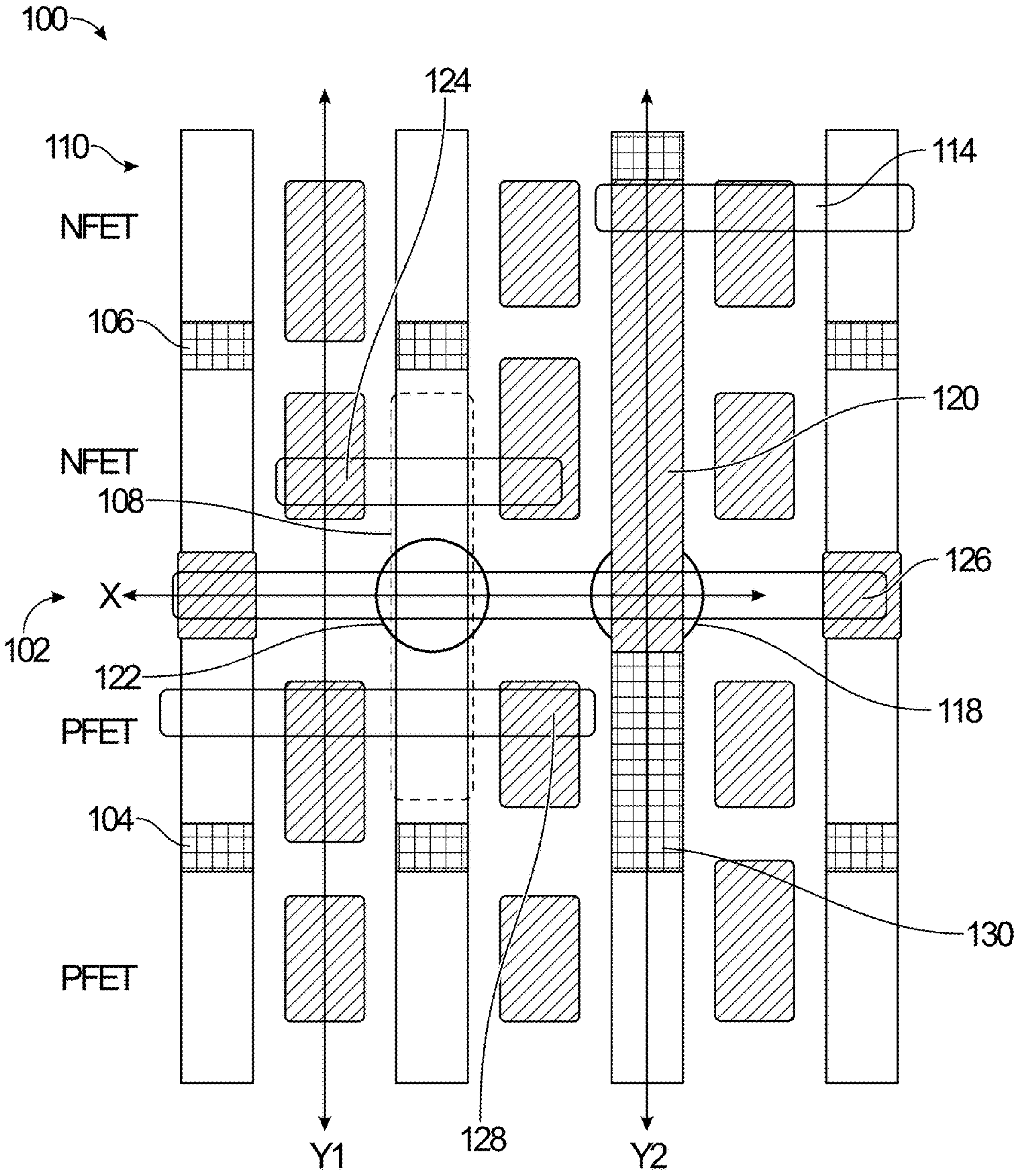
FIG. 1 depicts, in a schematic, a plan view of a multi-CMOS cell complementary metal-oxide-semiconductor (CMOS) integrated circuit that includes multiple CMOS devices, according to exemplary embodiments.
Figures 2, 3, 4:
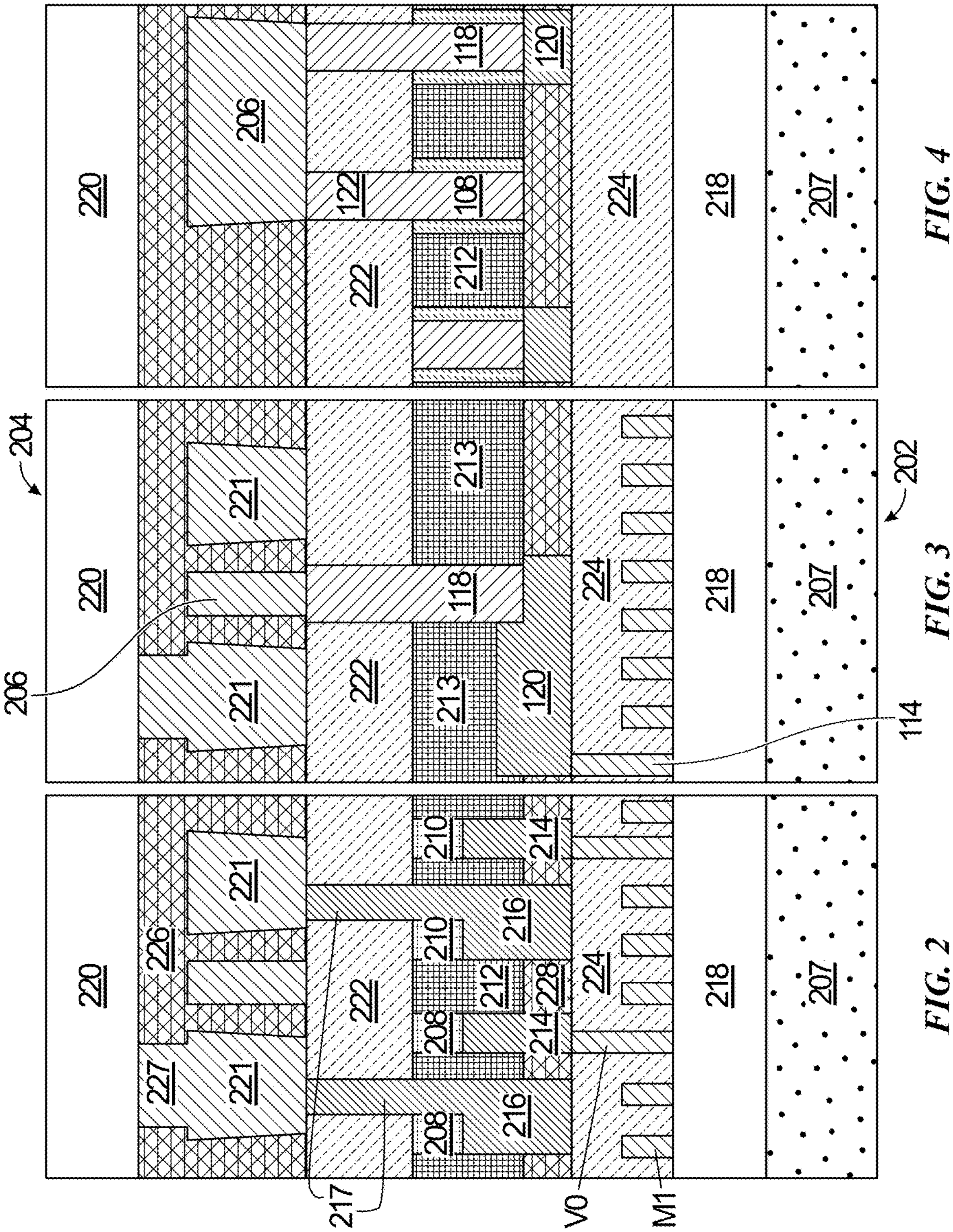
FIG. 2 through FIG. 4 depict, in schematics, side sectional views of the integrated circuit that is shown in FIG. 1.

FIG. 1 depicts, in a schematic, a plan view of a multi-CMOS cell complementary metal-oxide-semiconductor (CMOS) integrated circuit 100 that includes multiple CMOS devices, according to exemplary embodiments. FIG. 2 through FIG. 4 depict, in schematics, side sectional views of the integrated circuit 100 that is shown in FIG. 1. The views of FIG. 2, FIG. 3, and FIG. 4 are taken along cut lines Y1, Y2, and X of FIG. 1, respectively.

Referring to FIG. 1 through FIG. 4, the integrated circuit 100 has a frontside 202 and a backside 204. The integrated circuit also includes a first CMOS cell 102 of complementary metal oxide semiconductor (CMOS) devices (NFET and PFET), with a first row of gate cuts 104 and a second row of gate cuts 106 that bound the first CMOS cell; a gate 108 of one of the devices in the first CMOS cell; a second CMOS cell 110 of CMOS devices (only the NFET half of the CMOS cell is shown), which is bounded by the second row of gate cuts 106; a first signal line 114 that extends along the frontside of the second CMOS cell; and a signal connection from the first signal line to the gate. In one or more embodiments, the gate 108 is a common gate of a CMOS inverter, i.e. the gate 108 incorporates a gate of an n-type field effect transistor (NFET), a gate of a p-type field effect transistor (PFET) that is paired with the NFET, and a metal body joining the two gates. In one or more embodiments, the gate 108 is a single gate of a single NFET or PFET. In one or more embodiments, the signal connection includes a local interconnect 206 that extends along the backside of the first CMOS cell, a first via 118 in the first CMOS cell that connects to the local interconnect, a gate contact 120 that extends across the frontside of the first and second CMOS cells and connects the first signal line to the first via, and a second via 122 in the first CMOS cell that connects the local interconnect to the gate.

The signal connection is complicated because of signal line crowding in the first CMOS cell 102 of the integrated circuit 100. As can be seen in FIG. 1, there are three signal lines 124, 126, 128 that connect to or between gates or source/drain structures in the first CMOS cell, other than the gate 108. Because each signal line occupies finite width within the CMOS cell, there is no room for a fourth signal line to provide a bias signal to the gate 108. Accordingly, embodiments of the invention advantageously enable delivering a bias signal to the gate 108 in the first CMOS cell 102 from the signal line 114 in the second CMOS cell 110. This is accomplished by routing the bias signal through the gate contact 120 across the CMOS cells, then through the first via 118 to the backside of the first CMOS cell, then along the local interconnect 206 and thus to the gate 108.

FIG. 1 through FIG. 4 show additional details of the integrated circuit 100, which is mounted on a carrier wafer 207. The integrated circuit includes n-type source/drain structures 208 and p-type source/drain structures 210, which are separated by a dielectric 212. The integrated circuit also includes drain contacts 214 and source contacts 216. The drain contacts are connected to a frontside (Back End of Line or BEOL) interconnect layer 218, whereas the source contacts are connected to backside power rails 221 of a backside interconnect layer 220 by vias-to-buried-power-rail (VBPRs) 217. Oxide layers 222, 224 and additional dielectric 213, 226, 228 separate the conductive portions of the integrated circuit 100.

The remainder of the drawings show how to fabricate inventive portions of the integrated circuit 100. FIG. 5 through FIG. 36 depict, in schematics, various views of structures 500, 800, 1100, 1400, 1700, 2000, 2400, 2700, 3100, 3400 that are formed by selected steps of a method 3700 for making the integrated circuit 100. FIG. 37 depicts, in a flowchart, those steps of the method 3700, which correspond to the structures shown in FIG. 5 through FIG. 37.

Figure 7:
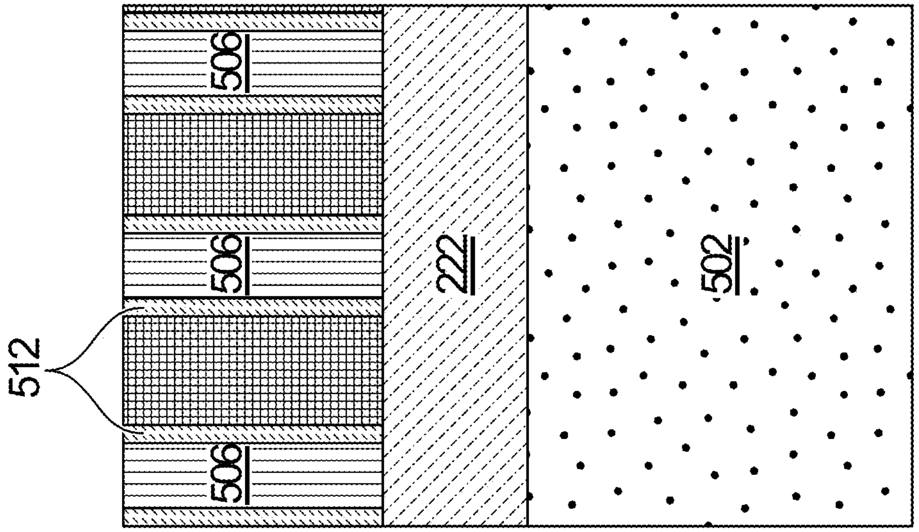
FIG. 5 through FIG. 22 depict, in schematics, side sectional views of structures formed by steps of a method for fabricating the integrated circuit that is shown in FIG. 1.
Figure 6:
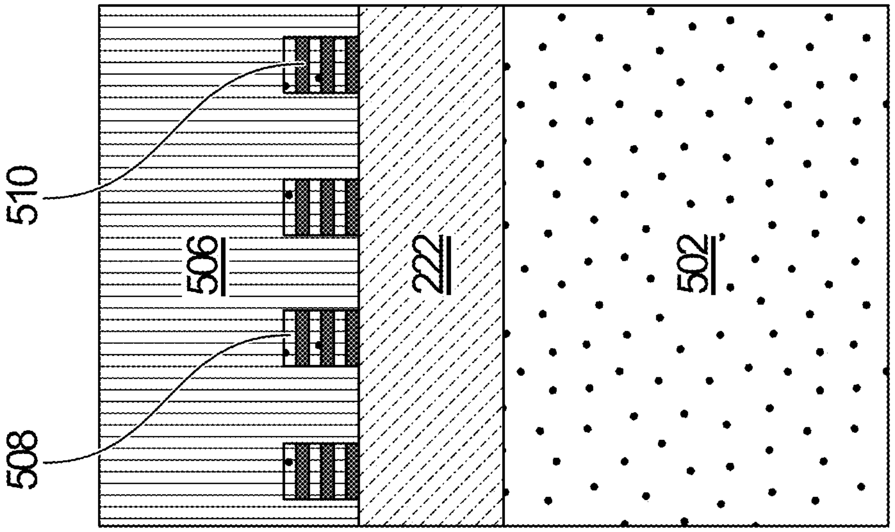
Figure 5:
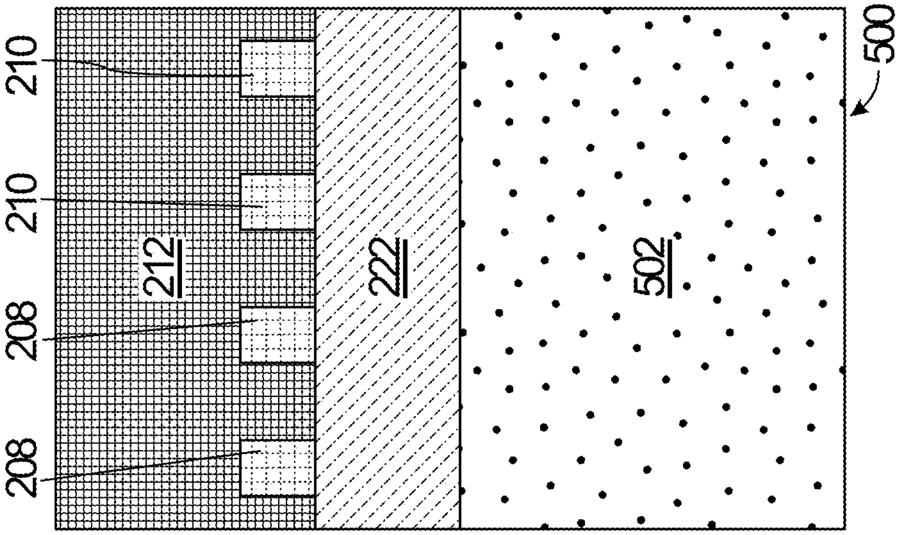

Referring to FIG. 5 through FIG. 7, which respectively correspond to view lines Y1, Y2, and X, at step 3702, begin with a structure 500 that includes a substrate 502, buried oxide layer 222, n-type source/drain structures 208 and p-type source/drain structures 210, which are separated by a dielectric 212. The structure 500 also includes dummy gate material 506, sacrificial nanosheets 510, channel nanosheets 508, and gate spacers 512. In subsequent steps, the sacrificial nanosheets are entirely removed, whereas the channel nanosheets 508 are removed only from selected regions of the structure (i.e., from the section shown in FIG. 6).

Figure 8:
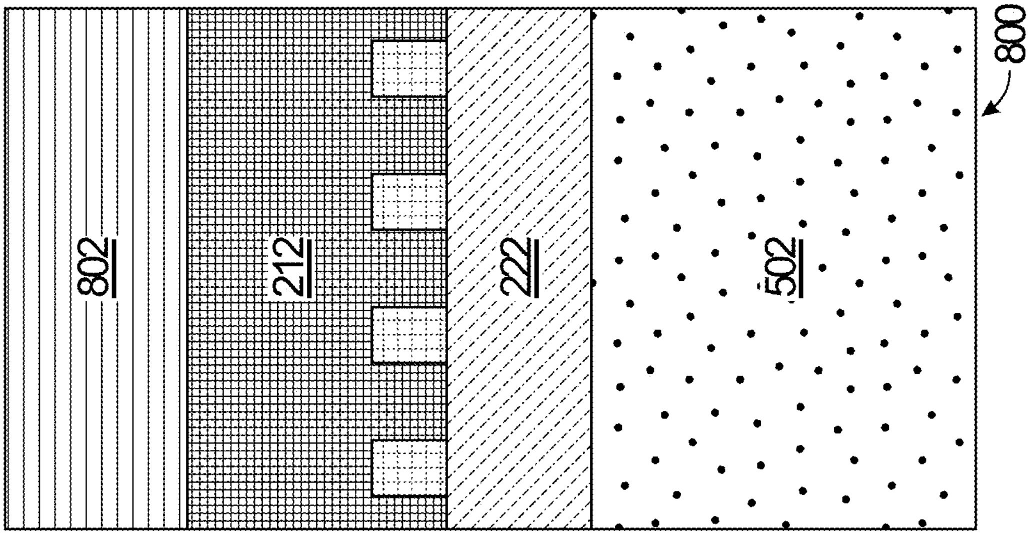
Figure 9:
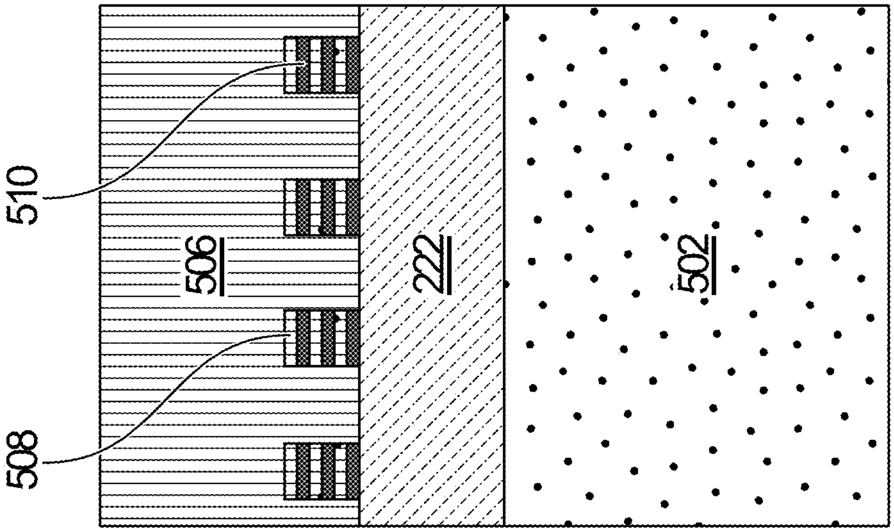
Figure 10:
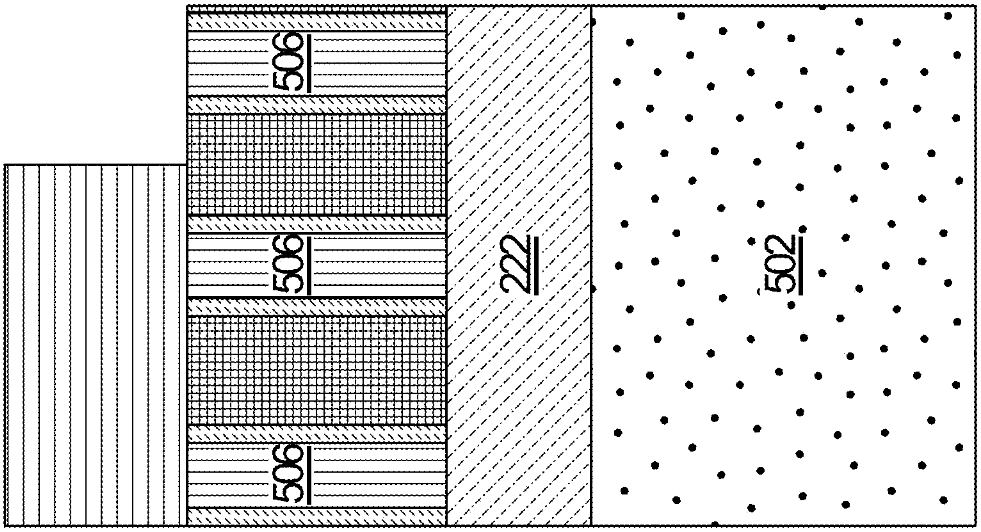

At step 3704, mask the structure 500 with an organic planarization layer (OPL) 802 to form a structure 800, as shown in FIG. 8 through FIG. 10, which respectively correspond to view lines Y1, Y2, and X.

Figure 13:
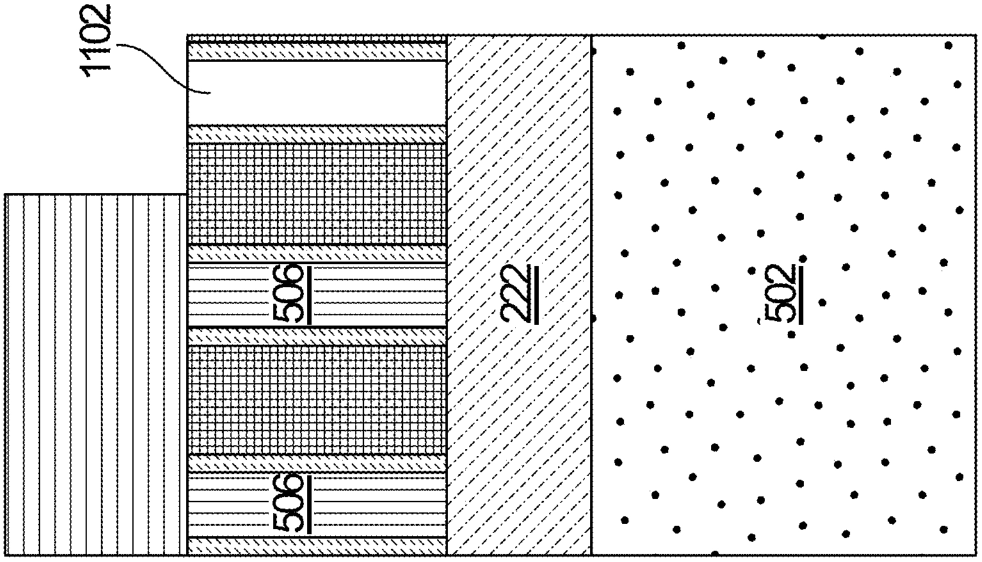
Figure 12:
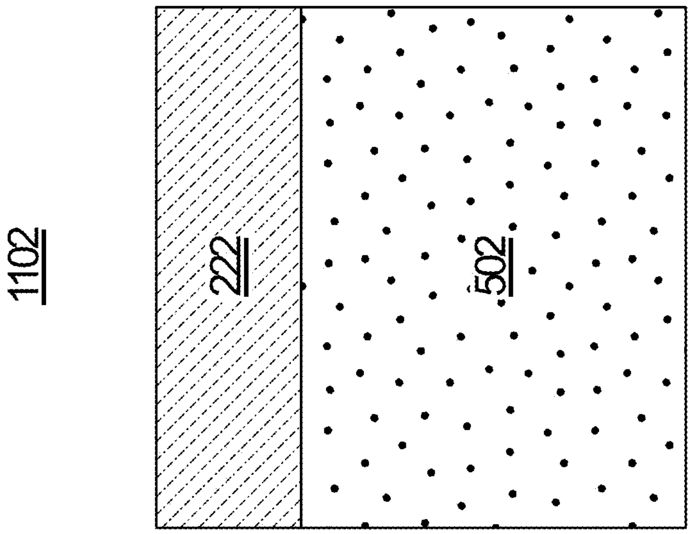
Figure 11:
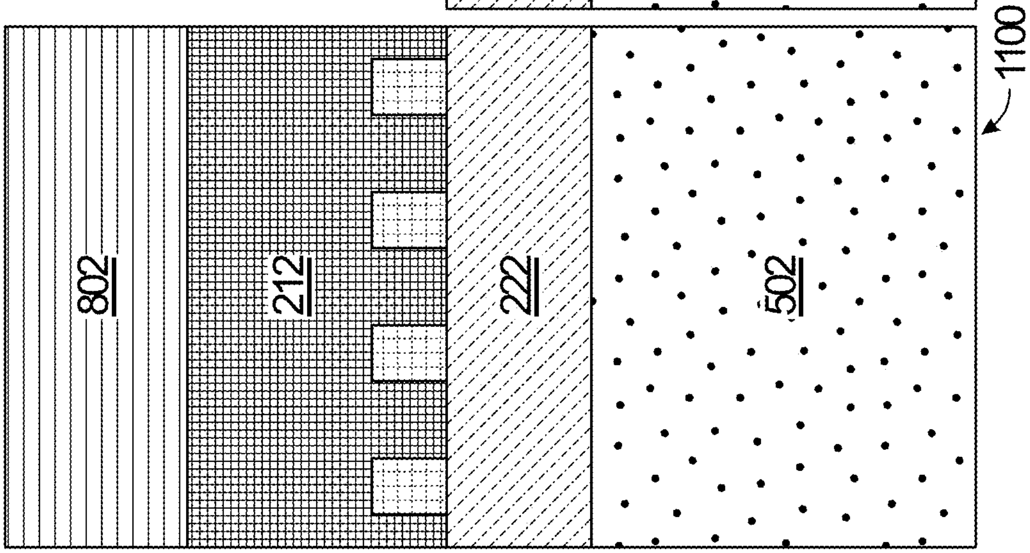

At step 3706, etch to form a structure 1100 (as shown in FIG. 11 through FIG. 13, which respectively correspond to view lines Y1, Y2, and X) from which some of the dummy gate material 506, the sacrificial nanosheets 508, and the channel nanosheets 510 have been removed to leave voids 1102.

Figure 14:
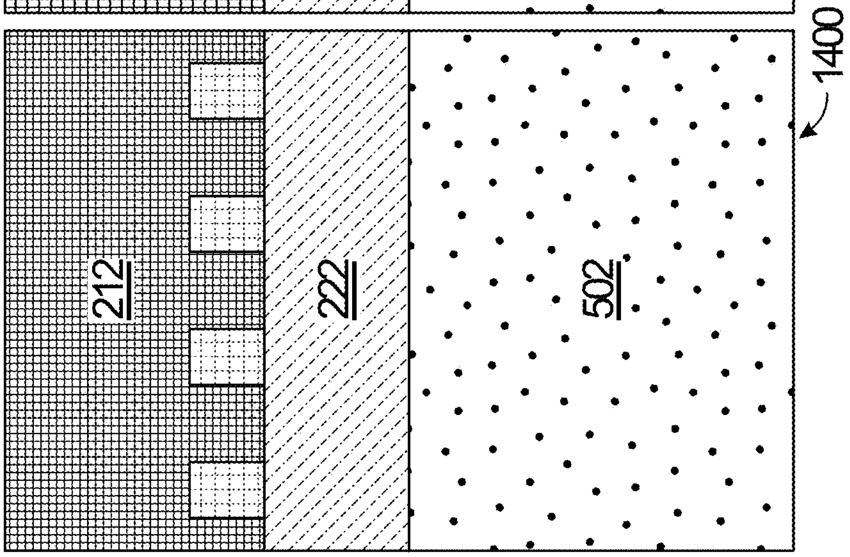
Figure 15:
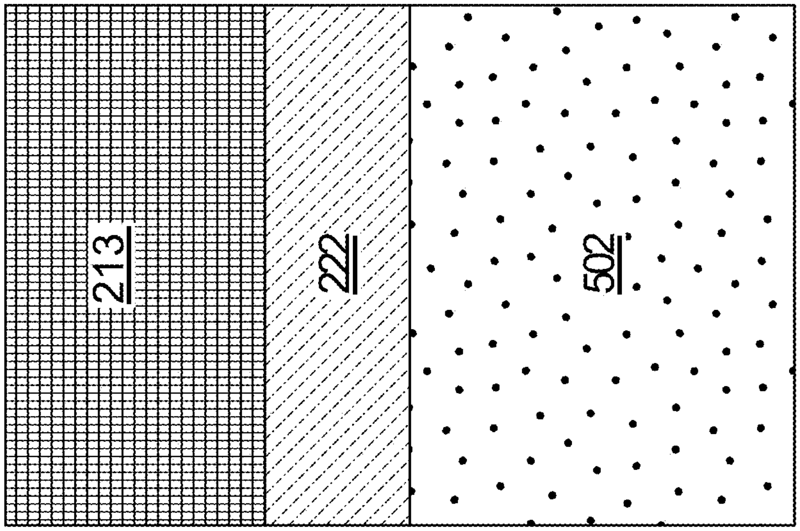
Figure 16:
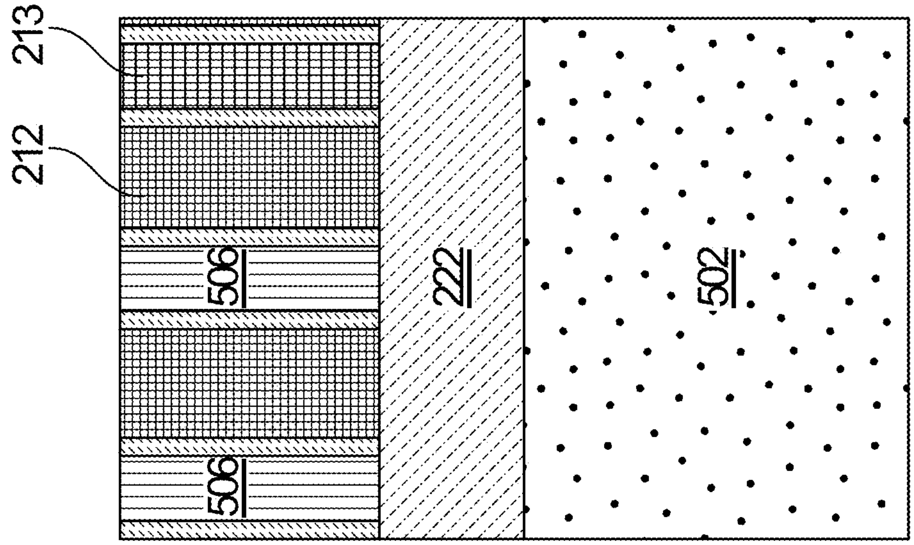

At step 3708, form a structure 1400 (as shown in FIG. 14 through FIG. 16, which respectively correspond to view lines Y1, Y2, and X) by removing the OPL mask and then filling etched portions with a dielectric 1402.

Figure 19:
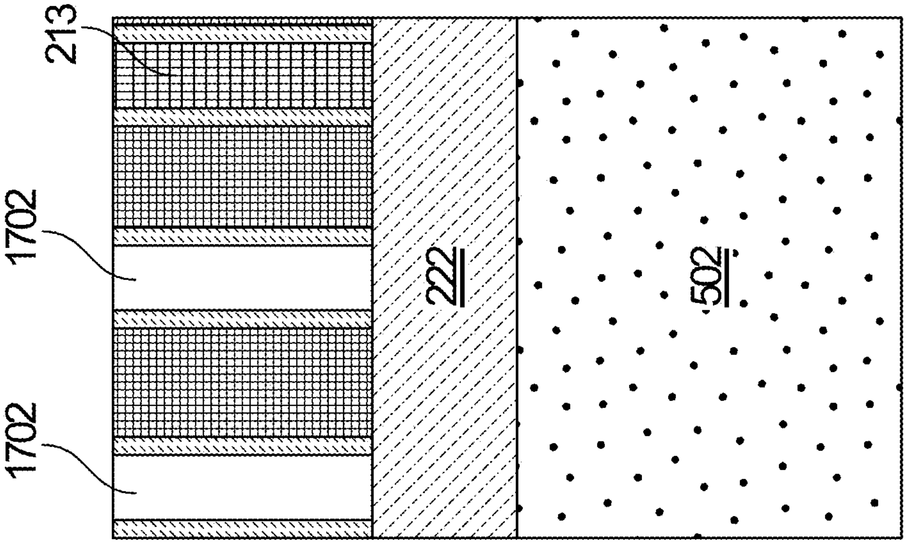
Figure 18:
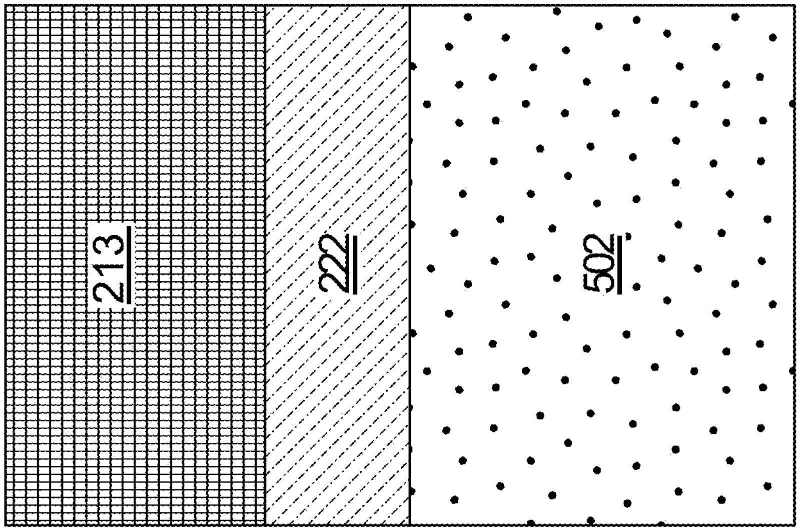
Figure 17:
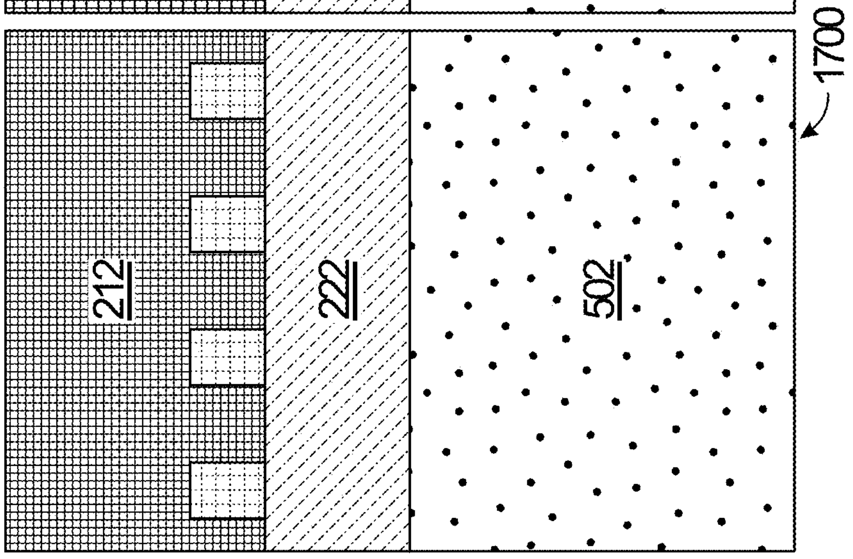

At step 3710, as shown in FIG. 17 through FIG. 19, which respectively correspond to view lines Y1, Y2, and X, form a structure 1700 by etching away remaining dummy gate material 506 followed by removing sacrificial nanosheets 510 (not shown) to leave voids 1702 for replacement gate processing.

Figure 22:
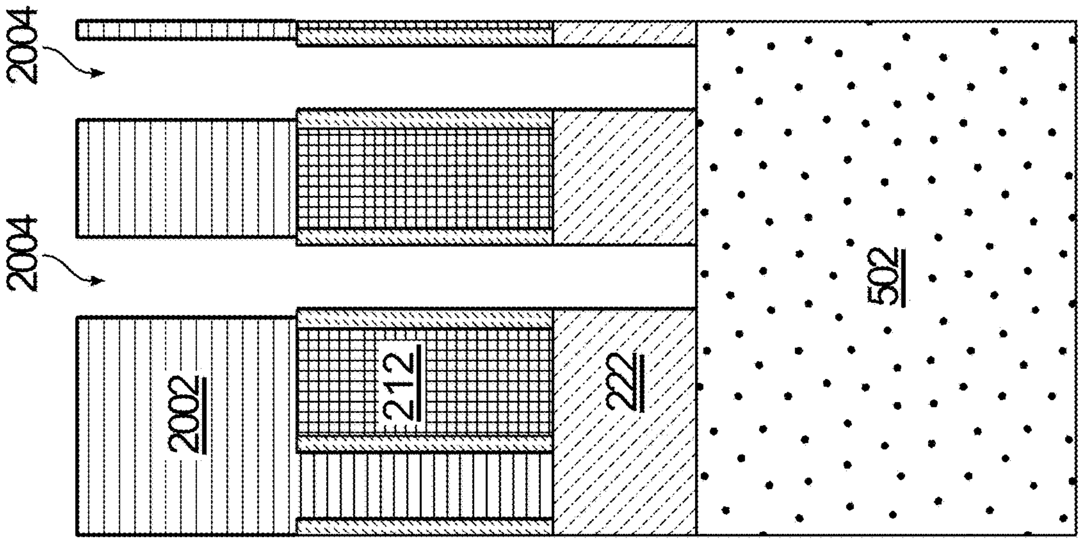
Figure 21:
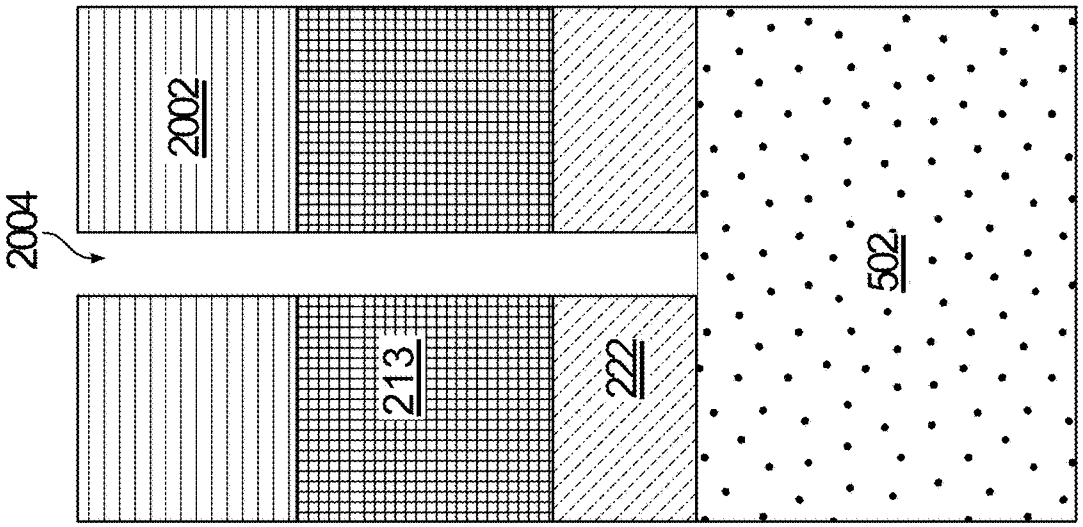
Figure 20:
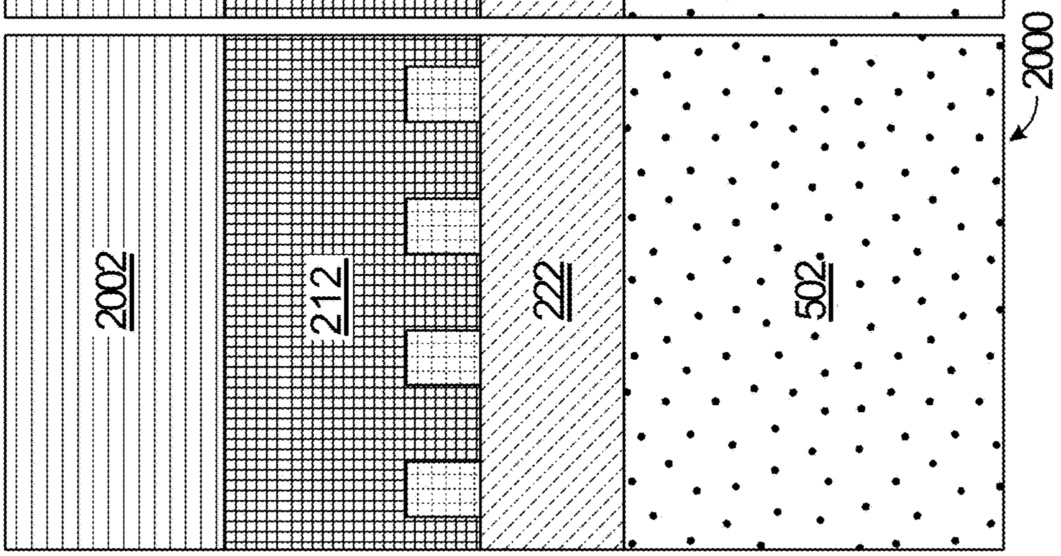
Figure 23:
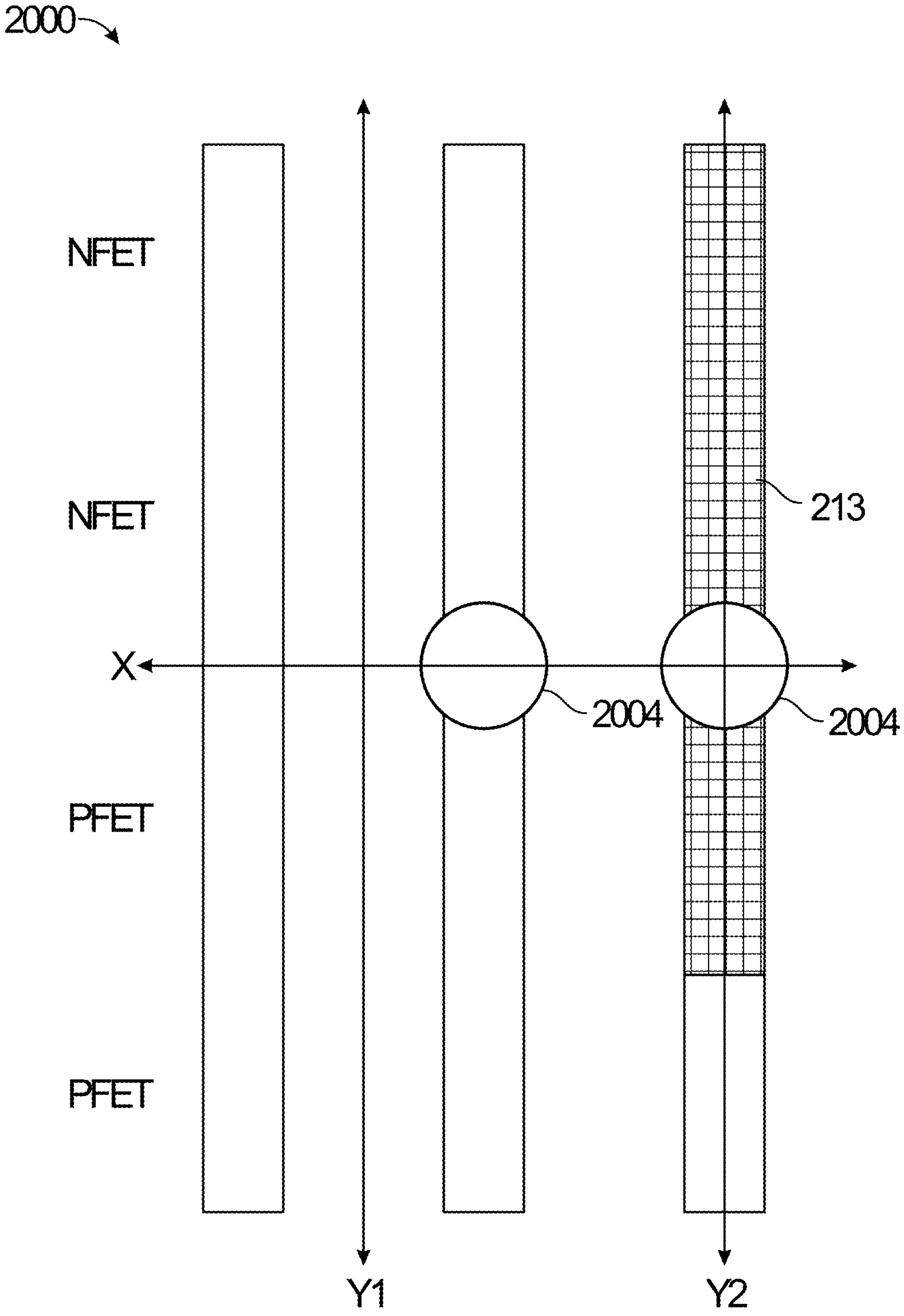
FIG. 23 depicts, in a schematic, a plan view of a structure that is formed by a step of a method for fabricating the integrated circuit that is shown in FIG. 1.

At step 3712, form a structure 2000 (as shown in FIGS. 20-23; FIGS. 20-22 respectively correspond to view lines Y1, Y2, and X of FIG. 23) by masking with an OPL 2002 and then etching to form voids 2004. Later, the voids 2004 will be filled with gate metal to form the vias 118, 122 (as shown in FIG. 1 through FIG. 4).

Figure 24:
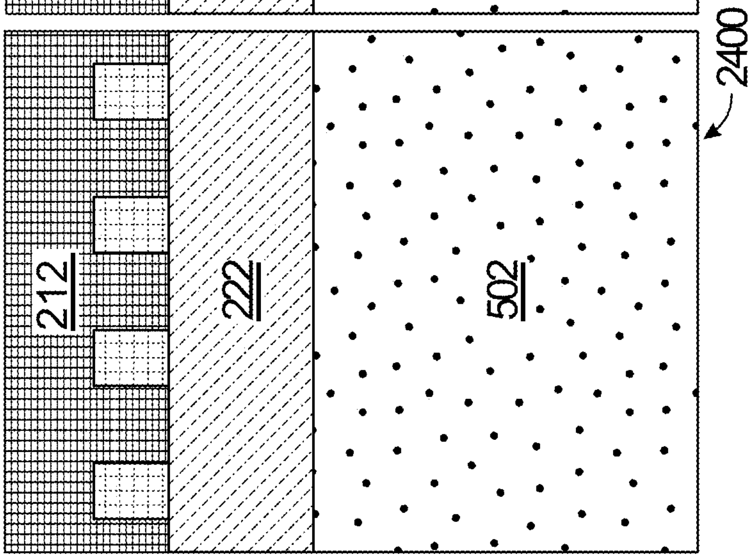
FIG. 24 through FIG. 26 depict, in schematics, side sectional views of the structure that is shown in FIG. 23.
Figure 25:
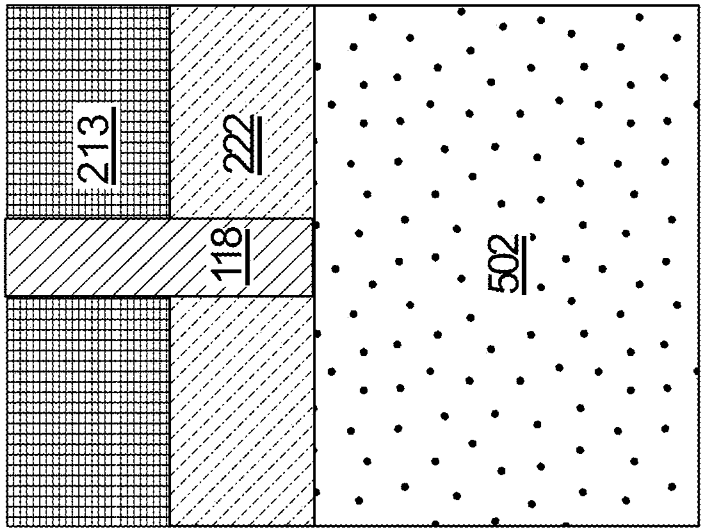
Figure 26:
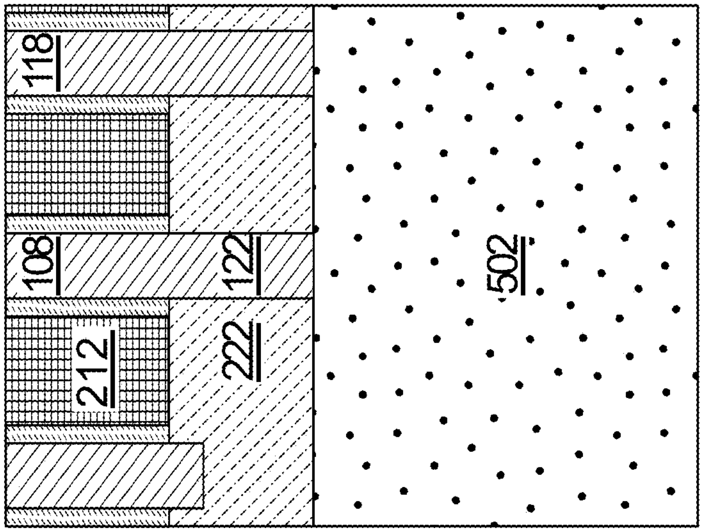

At step 3714, form a structure 2400 (as shown in FIG. 24 through 26, which respectively correspond to view lines Y1, Y2, and X) by filling the voids 2004 with replacement gate (RMG) that forms the vias 118, 122. Note that, in one or more embodiments, the "RMG" fill is done at the same time as forming other gates throughout the integrated circuit 100, so the gate metal typically would have multiple layers including a gate dielectric, such as HfO2, a work function metal, such as TiN, TiC, TiAlC, etc., and a conductive metal such as W, Al, or Ru.

Figure 27:
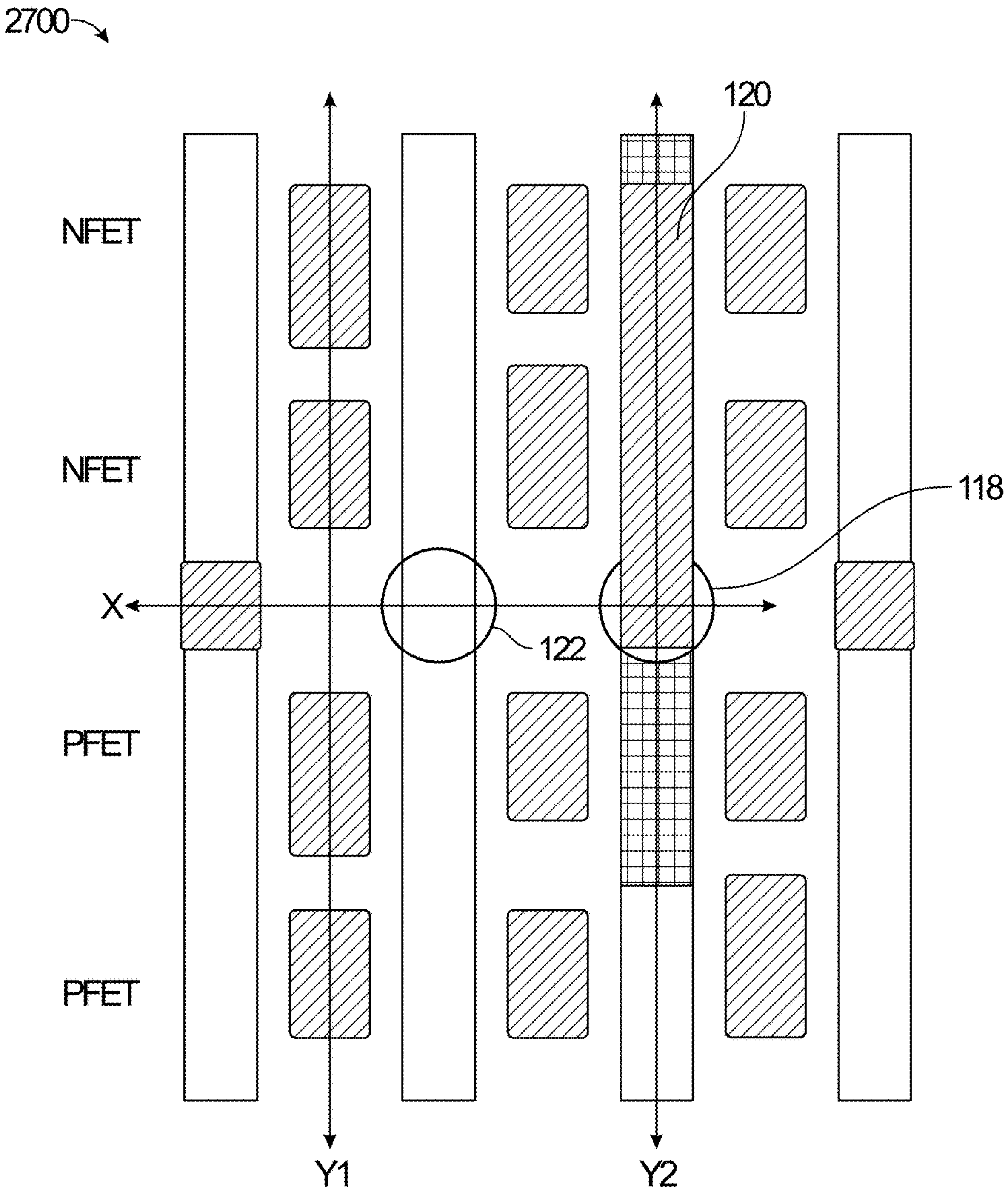
FIG. 27 depicts, in a schematic, a plan view of a structure that is formed by a step of a method for fabricating the integrated circuit that is shown in FIG. 1.
Figures 28, 29, 30:
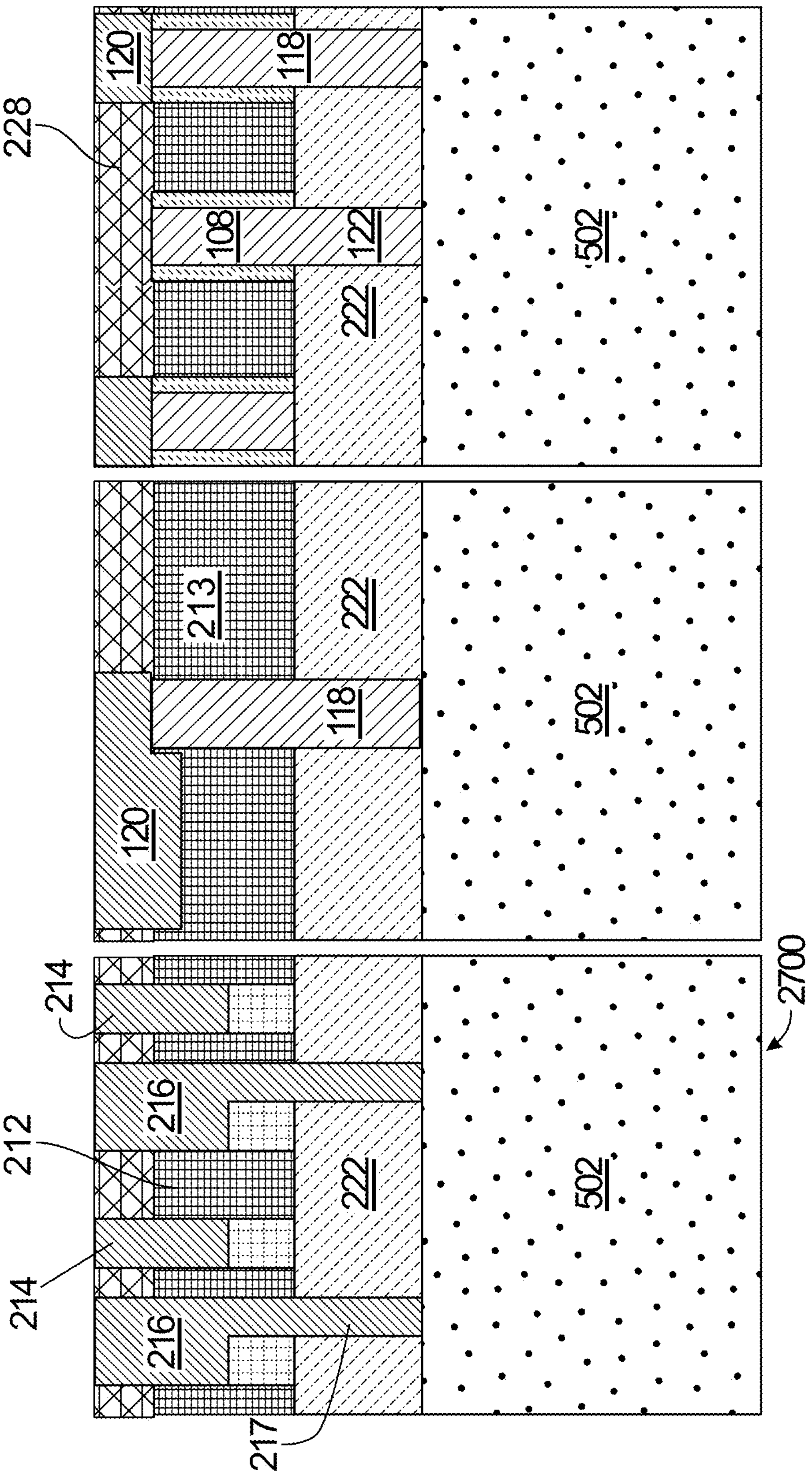
FIG. 28 through FIG. 30 depict, in schematics, side sectional views of the structure that is shown in FIG. 27.

Referring to FIG. 27 and to FIG. 28 through FIG. 30 (which respectively correspond to view lines Y1, Y2, and X in FIG. 27), at step 3716 form metal contacts that include the source/drain contacts 214, 216, via-to-backside power rail (VBPR) 217 and the gate contact 120. These contacts are formed by conventional lithography, etch and metallization process.

Figure 33:
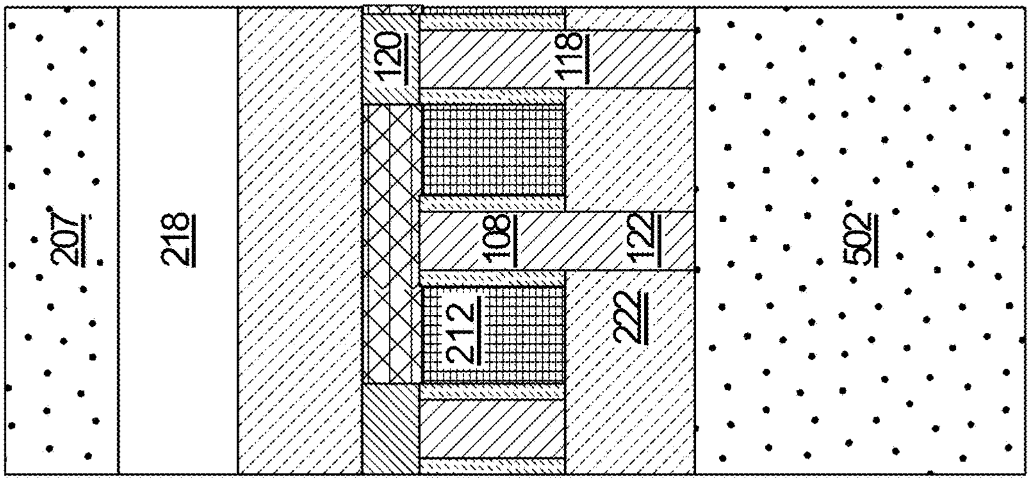
FIG. 31 through FIG. 36 depict, in schematics, side sectional views of structures formed by steps of a method for fabricating the integrated circuit that is shown in FIG. 1.
Figure 32:
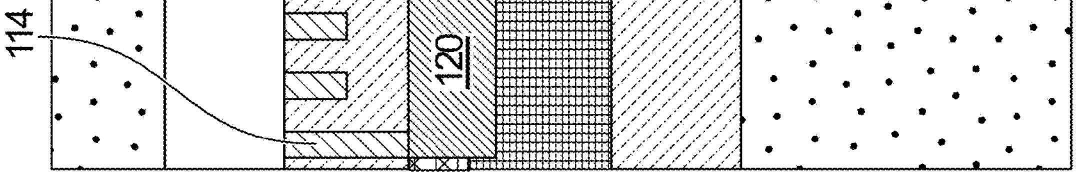
Figure 31:
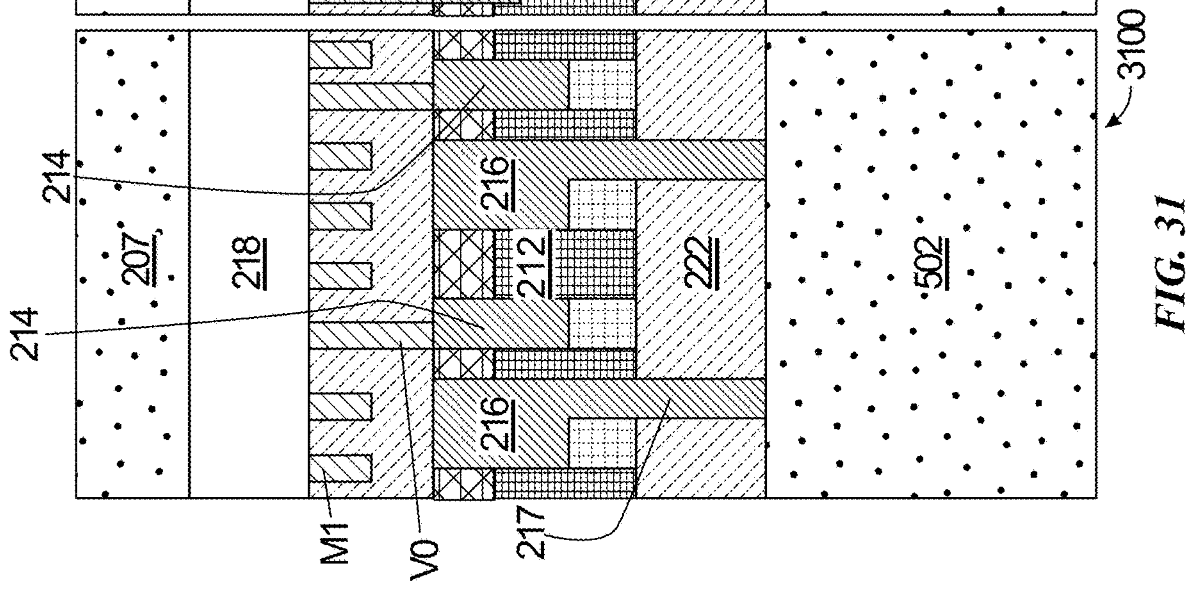

At step 3718, as shown in FIG. 31 through FIG. 33, which respectively correspond to view lines Y1, Y2, and X, form a structure 3100 that includes the M1 and V0 which serve as bottom most metal line for signal line routing, and additional BEOL interconnect 218 above it. After that, the carrier wafer 207 is bonded over the topmost layer of BEOL interconnect 218.

Figure 36:
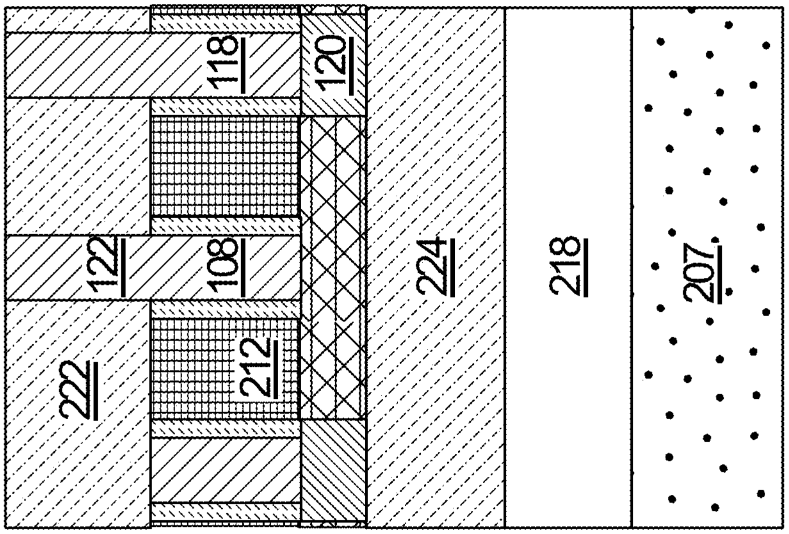
Figure 35:
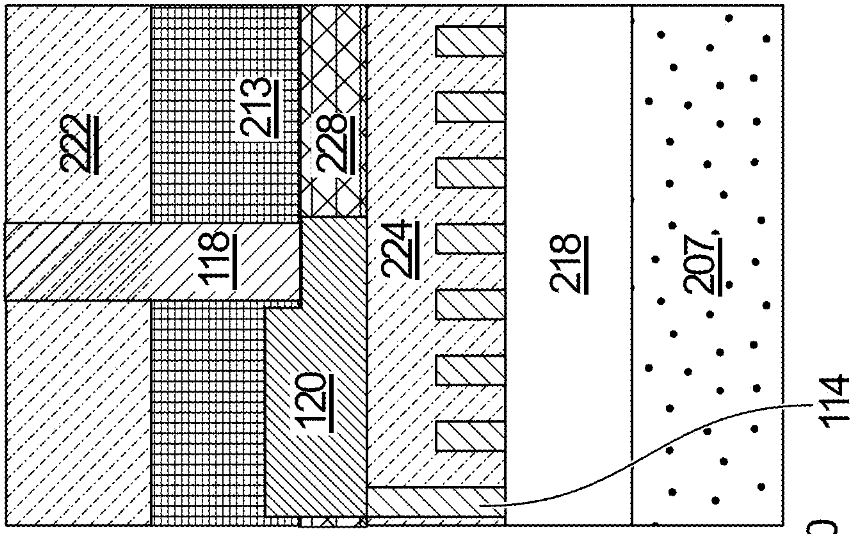
Figure 34:
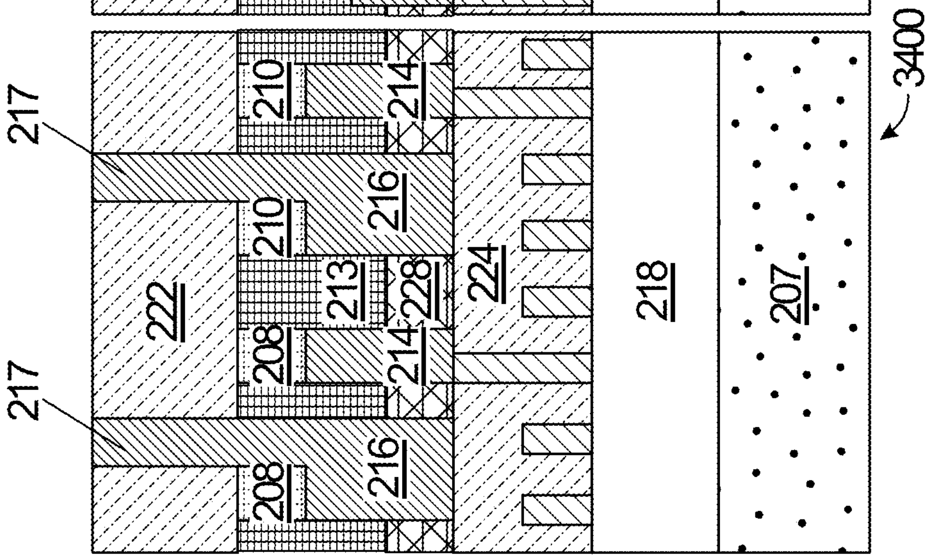
Figure 37:
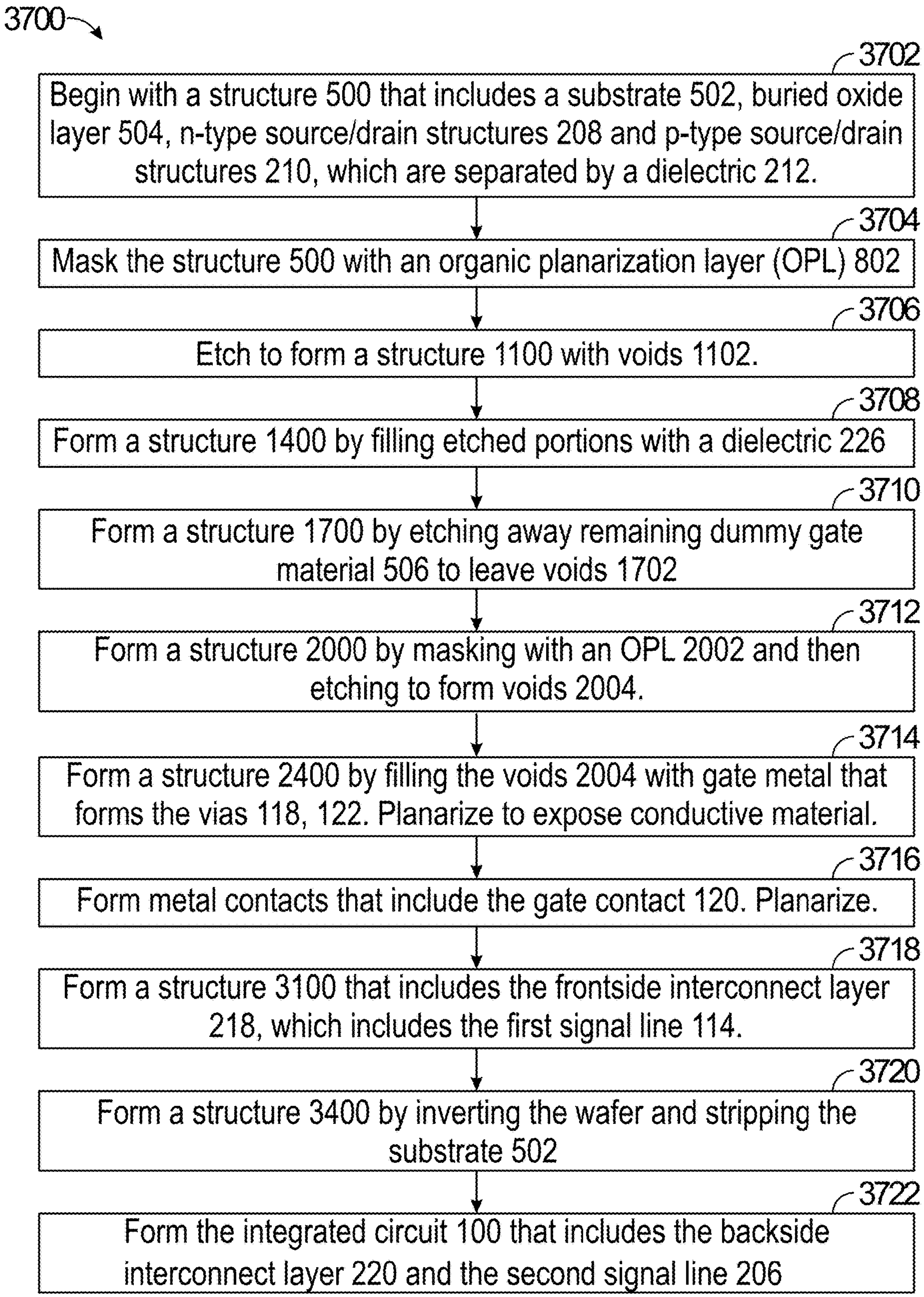
FIG. 37 depicts, in a flowchart, steps of a method for fabricating the integrated circuit that is shown in FIG. 1, according to exemplary embodiments.

At step 3720, as shown in FIG. 34 through FIG. 36, which respectively correspond to view lines Y1, Y2, and X, form a structure 3400 by flipping the wafer and stripping the substrate 502. Then, referring back to FIG. 1 through FIG. 4, at step 3722 form the integrated circuit 100 that includes: backside power rails 221 which are connected to VBPRs 217; backside local interconnect 206 which wires a gate from the $1^{st}$ CMOS cell to a signal line over the $2^{nd}$ CMOS cell through via 122/118 and gate contact 120; the backside interconnect layer 220, and vias 227 which connects backside power rails 221 to backside interconnect layer 220. Backside power rails, backside local interconnect, backside via, and backside interconnect 220 are formed in the backside ILD 226 by deposition, lithography patterning, etching, and metallization processes. Note that, in one or more embodiments, local interconnect 206 does not connect to backside interconnect 220 as it serves as a connection between circuit components nearby locally.

Given the discussion thus far, it will be appreciated that, in general terms, an exemplary integrated circuit 100 has a frontside 202 and a backside 204, and includes a first CMOS cell 102 of complementary metal oxide semiconductor (CMOS) devices, with a first row of gate cuts 104 and a second row of gate cuts 106 that bound the first CMOS cell; a gate 108 associated with at least one of the devices in the first CMOS cell; a first signal line 114 at the frontside of the integrated circuit; a signal connection 120, 118 from the first signal line to the backside of the integrated circuit; and a local interconnect 206 at the backside of the integrated circuit from the signal connection to the gate.

With regard to the gate 108 associated with at least one of the devices in the first CMOS cell, it will be appreciated that in general, each field effect transistor (FET) includes a gate, a drain, and a source, and that in some instances, devices may have a common gate. For example, the complementary metal oxide semiconductor (CMOS) devices can include an n-type field effect transistor (NFET) and a p-type field effect transistor (PFET) (generally, multiple pairs of NFETs and PFETs). The gate can be a common gate of the NFET and the PFET. The NFET and PFET can form a CMOS logic gate such as a CMOS inverter. The skilled artisan will of course understand the distinction between a logic gate (device implementing a Boolean function) and the gate of a FET which when energized renders the channel region conductive between the source and drain.

In addition to a common gate, such as for a CMOS pair, in some cases, the complementary metal oxide semiconductor (CMOS) devices include a field effect transistor, and the gate is a single gate of the field effect transistor.

In one or more embodiments, the integrated circuit 100 further includes a second CMOS cell 110 of CMOS devices, which is bounded by the second row of gate cuts, and the first signal line 114 extends along the frontside of the second CMOS cell.

In one or more embodiments, the signal connection comprises a local interconnect 206 that extends along the backside of the first CMOS cell 102. In one or more embodiments, the signal connection comprises a first via 118 in the first CMOS cell that connects to the local interconnect 206, a gate contact 120 that extends across the frontside of the first and second CMOS cells and connects the first signal line to the first via, and a second via 122 in the first CMOS cell that connects the local interconnect to the gate. In one or more embodiments, the second via 122 is formed under the gate 108. In one or more embodiments, the integrated circuit 100 also includes a diffusion break 130 that is aligned to the gate contact, wherein the first via 118 is formed inside the diffusion break.

According to another aspect, an exemplary method for providing a bias signal to a gate 108 that is in a first CMOS cell 102 of a multi-cell CMOS apparatus, from a first signal line 114 that is at the frontside of a second CMOS cell 110 of the multi-cell CMOS apparatus, includes transmitting the bias signal along the first signal line 114 to a gate contact 120 at the frontside of the second CMOS cell; transmitting the bias signal along the gate contact to a first via 118 in the first CMOS cell; transmitting the bias signal through the first via to a local interconnect 206 at the backside of the first CMOS cell; and transmitting the bias signal along the local interconnect to a second via 122 that is in contact with the gate 108.

According to another aspect, an exemplary method 3700 for fabrication of an integrated circuit structure includes, at 3714, forming first and second vias 118, 122 in a first CMOS cell of complementary metal-oxide-semiconductor (CMOS) devices, such that the second via connects to a gate in one of the CMOS devices; at 3716, forming, at a frontside of the first CMOS cell, a gate contact 120 that bridges from the first via to a second CMOS cell of CMOS devices; and, at 3722 forming, at a backside of the first CMOS cell, a signal line 206 that bridges from the first via to the second via.

In one or more embodiments, the method also includes forming the second via under the gate 108. In one or more embodiments, the method also includes forming the first via 118 in a diffusion break 130 that is aligned to the gate contact 120.

Figure 38:
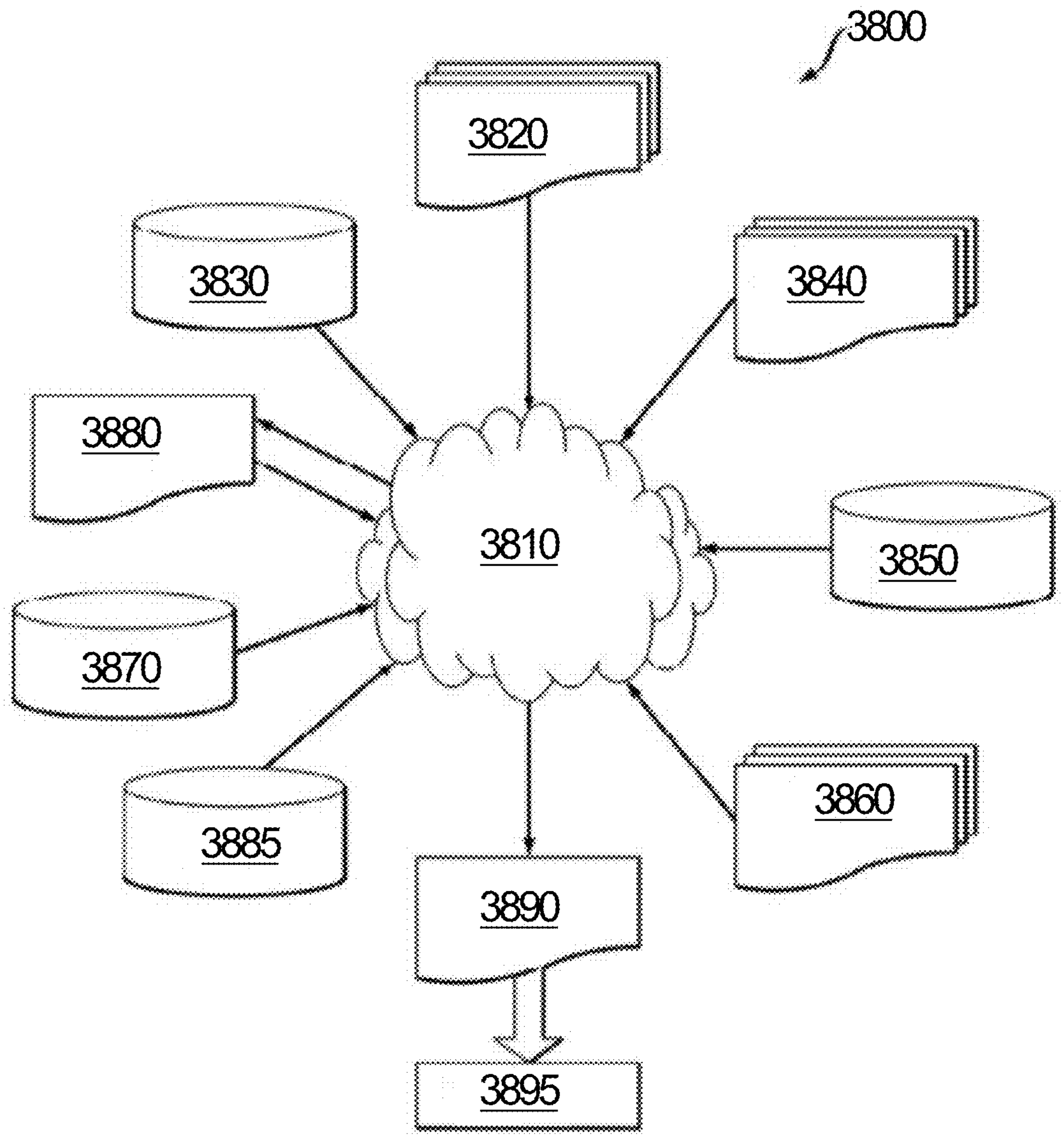
FIG. 38 is a flow diagram of a design process used in semiconductor design, manufacture, and/or test.

According to another aspect, a circuit design structure is instantiated and then fabricated. Accordingly, in one or more embodiments, the layout is instantiated as a design structure. In this regard, FIG. 38 shows a block diagram of an exemplary design flow 3800 used for example, in semiconductor IC logic design, simulation, test, layout, and manufacture. Design flow 3800 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 3800 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 3800 may vary depending on the type of representation being designed. For example, a design flow 3800 for building an application specific IC (ASIC) may differ from a design flow 3800 for designing a standard component or from a design flow 3800 for instantiating the design into a programmable array, for example a programmable gate array (PGA) or a field programmable gate array (FPGA) offered by Altera® Inc. or Xilinx® Inc.

FIG. 38 illustrates multiple such design structures including an input design structure 3820 that is preferably processed by a design process 3810. Design structure 3820 may be a logical simulation design structure generated and processed by design process 3810 to produce a logically equivalent functional representation of a hardware device. Design structure 3820 may also or alternatively comprise data and/or program instructions that when processed by design process 3810, generate a functional representation of the physical structure of a hardware device. Whether representing functional and/or structural design features, design structure 3820 may be generated using electronic computer-aided design (ECAD) such as implemented by a core developer/designer. When encoded on a gate array or storage medium or the like, design structure 3820 may be accessed and processed by one or more hardware and/or software modules within design process 3810 to simulate or otherwise functionally represent an electronic component, circuit, electronic or logic module, apparatus, device, or system. As such, design structure 3820 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 3810 preferably employs and incorporates hardware and/or software modules for synthesizing, translating, or otherwise processing a design/simulation functional equivalent of components, circuits, devices, or logic structures to generate a Netlist 3880 which may contain design structures such as design structure 3820. Netlist 3880 may comprise, for example, compiled or otherwise processed data structures representing a list of wires, discrete components, logic gates, control circuits, I/O devices, models, etc. that describes the connections to other elements and circuits in an integrated circuit design. Netlist 3880 may be synthesized using an iterative process in which netlist 3880 is resynthesized one or more times depending on design specifications and parameters for the device. As with other design structure types described herein, netlist 3880 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 3810 may include hardware and software modules for processing a variety of input data structure types including Netlist 3880. Such data structure types may reside, for example, within library elements 3830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 3840, characterization data 3850, verification data 3860, design rules 3870, and test data files 3885 which may include input test patterns, output test results, and other testing information. Design process 3810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 3810 without deviating from the scope and spirit of the invention. Design process 3810 may also include modules for performing standard circuit design processes such as timing analysis, verification, design rule checking, place and route operations, etc. Improved latch tree synthesis can be performed as described herein.

Design process 3810 employs and incorporates logic and physical design tools such as HDL compilers and simulation model build tools to process design structure 3820 together with some or all of the depicted supporting data structures along with any additional mechanical design or data (if applicable), to generate a second design structure 3890. Design structure 3890 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 3820, design structure 3890 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 3890 may comprise a compiled, executable HDL simulation model that functionally simulates the devices to be analyzed.

Design structure 3890 may also employ a data format used for the exchange of layout data of integrated circuits and/or symbolic data format (e.g. information stored in a GDSII (GDS2), GL1, OASIS, map files, or any other suitable format for storing such design data structures). Design structure 3890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., lib files). Design structure 3890 may then proceed to a stage 3895 where, for example, design structure 3890: proceeds to tape-out, is released to manufacturing, is released to a mask house, is sent to another design house, is sent back to the customer, etc.

Figure 39:
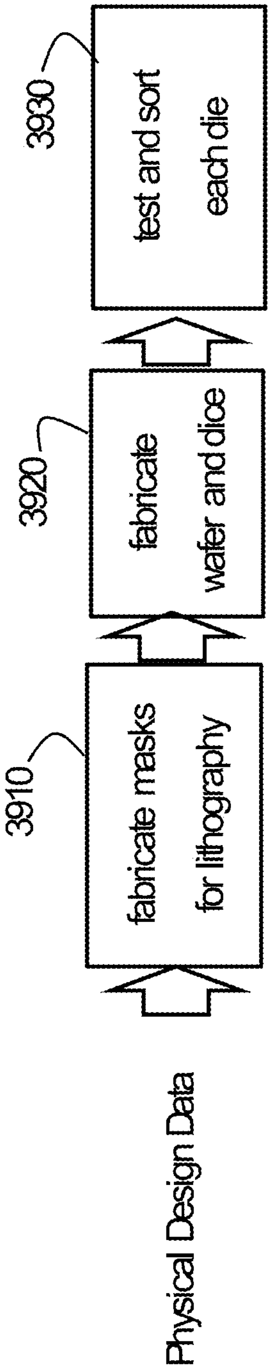
FIG. 39 shows further aspects of IC fabrication from physical design data.

Once the physical design data is obtained, based, in part, on aspects as described herein, an integrated circuit designed in accordance therewith can be fabricated according to known processes that are generally described with reference to FIG. 39. Generally, a wafer with multiple copies of the final design is fabricated and cut (i.e., diced) such that each die is one copy of the integrated circuit. At block 3910, the processes include fabricating masks for lithography based on the finalized physical layout. At block 3920, fabricating the wafer includes using the masks to perform photolithography and etching. Once the wafer is diced, testing and sorting each die is performed at 3930 to filter out any faulty die.

Furthermore, referring to FIG. 38, in one or more embodiments the at least one processor (see discussion of FIG. 41) is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure.

Figure 40:
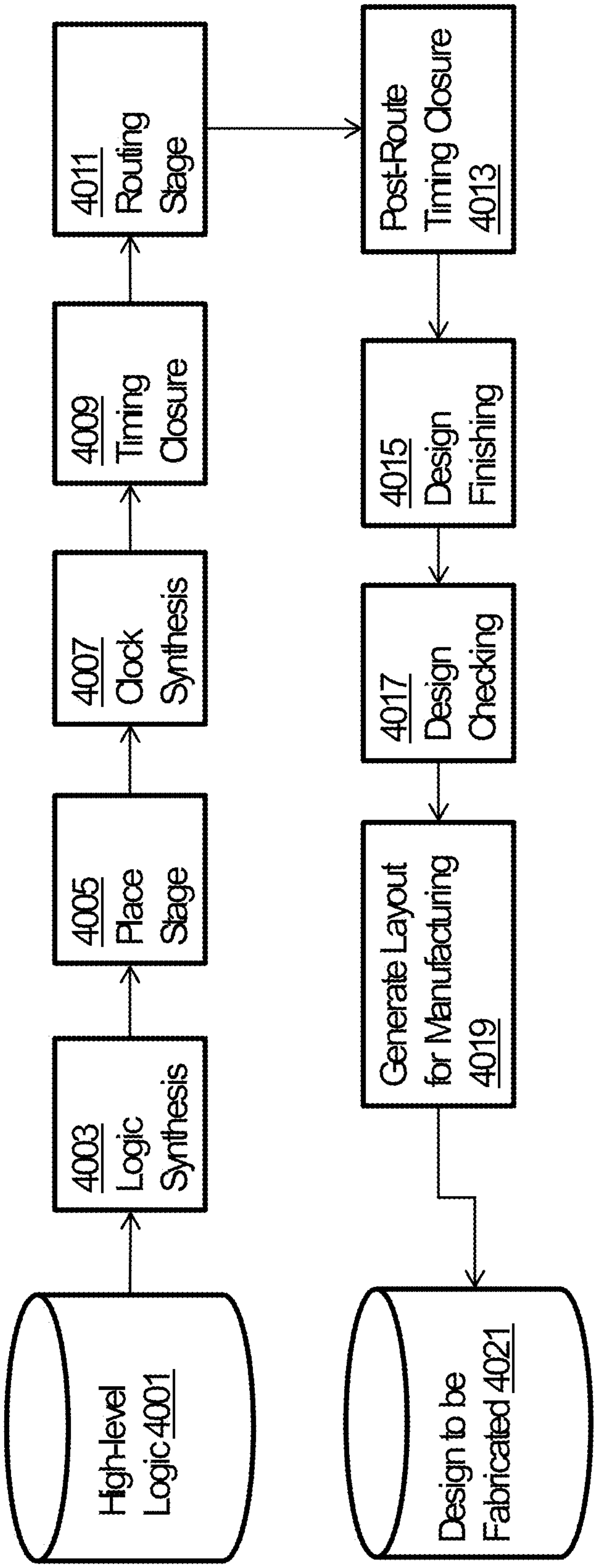
FIG. 40 shows an exemplary high-level Electronic Design Automation (EDA) tool flow.

FIG. 40 depicts an example high-level Electronic Design Automation (EDA) tool flow, which is responsible for creating an optimized microprocessor (or other IC) design to be manufactured. A designer could start with a high-level logic description 4001 of the circuit (e.g. VHDL or Verilog).

The logic synthesis tool 4003 compiles the logic, and optimizes it without any sense of its physical representation, and with estimated timing information. The placement tool 4005 takes the logical description and places each component, looking to minimize congestion in each area of the design. The clock synthesis tool 4007 optimizes the clock tree network by cloning/balancing/buffering the latches or registers. The timing closure step 4009 performs a number of optimizations on the design, including buffering, wire tuning, and circuit repowering; its goal is to produce a design which is routable, without timing violations, and without excess power consumption. The routing stage 4011 takes the placed/optimized design, and determines how to create wires to connect all of the components, without causing manufacturing violations. Post-route timing closure 4013 performs another set of optimizations to resolve any violations that are remaining after the routing. Design finishing 4015 then adds extra metal shapes to the netlist, to conform with manufacturing requirements. The checking steps 4017 analyze whether the design is violating any requirements such as manufacturing, timing, power, electromigration (e.g., using techniques disclosed herein) or noise. When the design is clean, the final step 4019 is to generate a layout for the design, representing all the shapes to be fabricated in the design to be fabricated 4021.

Figure 41:
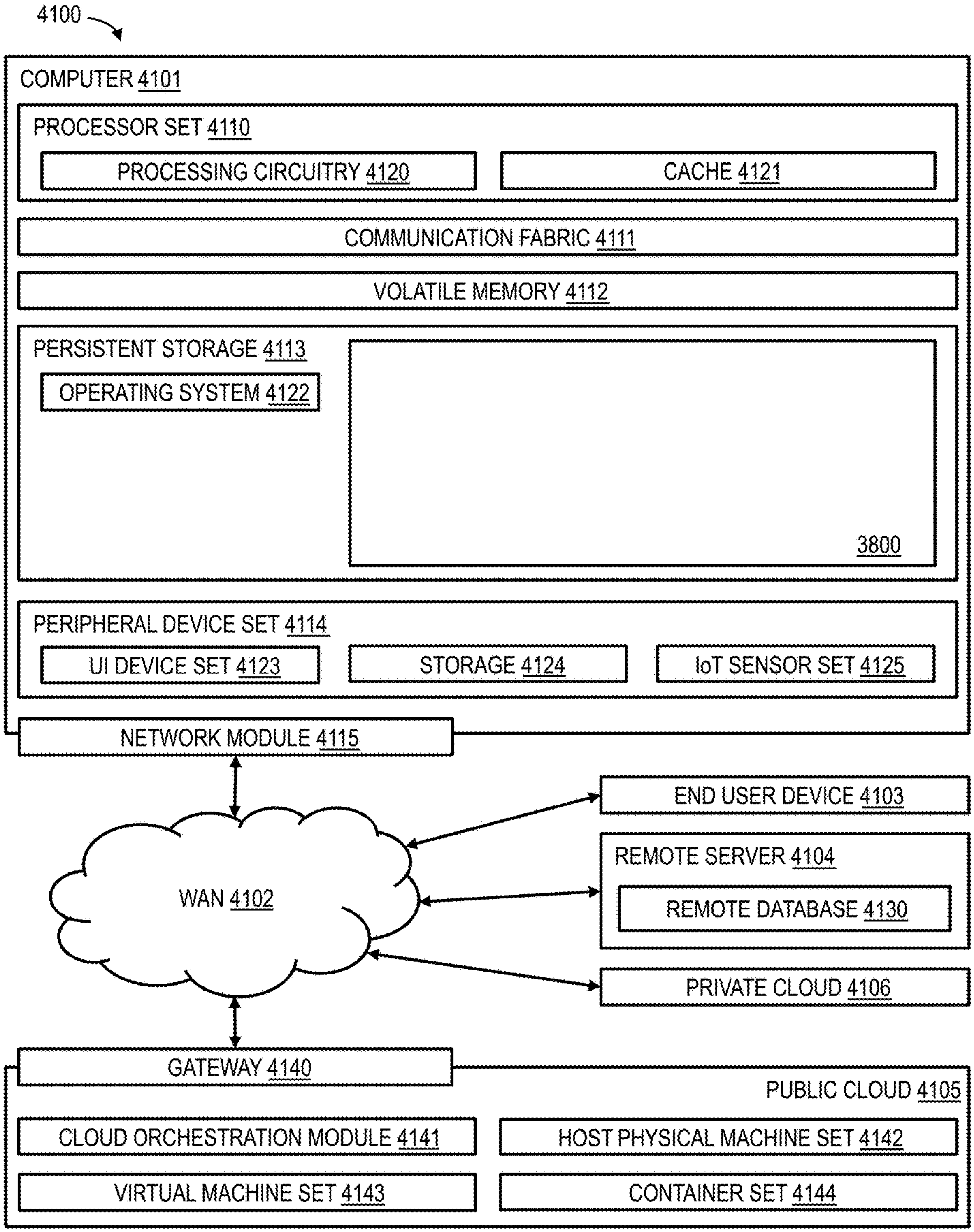
FIG. 41 depicts a computing environment according to an embodiment of the present invention (e.g., to implement aspects related to a hardware description language (HDL) design structure).

Refer now to FIG. 41, which depicts a computing environment 4100 useful with aspects of the present invention, such as an EDA process.

Computing environment 4100 contains an example of an environment for the execution of at least some of the computer code involved in performing the inventive methods, such as implementing the above-mentioned design flow 3800. In addition to block 200, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 200, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144.

COMPUTER 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 41. On the other hand, computer 4101 is not required to be in a cloud except to any extent as may be affirmatively indicated.

PROCESSOR SET 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 200 in persistent storage 4113.

COMMUNICATION FABRIC 4111 is the signal conduction path that allows the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 4112 is any type of volatile memory now known or to be developed in the future. Examples include dynamic type random access memory (RAM) or static type RAM. Typically, volatile memory 4112 is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

PERSISTENT STORAGE 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector.

NETWORK MODULE 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

REMOTE SERVER 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

PUBLIC CLOUD 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An integrated circuit that has a frontside and a backside, the integrated circuit comprising:

a first CMOS cell of complementary metal oxide semiconductor (CMOS) devices, with a first row of gate cuts and a second row of gate cuts that bound the first CMOS cell;

a gate associated with at least one of the CMOS devices in the first CMOS cell;

a first signal line at the frontside of the integrated circuit;

a signal connection from the first signal line to the backside of the integrated circuit; and a local interconnect at the backside of the integrated circuit from the signal connection to the gate.

2. The integrated circuit of claim 1, wherein the integrated circuit further comprises:

a second CMOS cell of CMOS devices, which is bounded by the second row of gate cuts, wherein the first signal line extends along the frontside of the second CMOS cell.

3. The integrated circuit of claim 1, wherein the signal connection comprises a first via in the first CMOS cell that connects to the local interconnect and a gate contact that extends across the frontside of the first and second CMOS cells and connects the first signal line to the first via.

4. The integrated circuit of claim 3, wherein the gate incorporates a second via that contacts the local interconnect.

5. The integrated circuit of claim 3, further comprising a diffusion break that is aligned to the gate contact, wherein the first via is formed inside the diffusion break.

6. The integrated circuit of claim 1, wherein the complementary metal oxide semiconductor (CMOS) devices include an n-type field effect transistor and a p-type field effect transistor, and wherein the gate is a common gate of the n-type field effect transistor and the p-type field effect transistor.

7. The integrated circuit of claim 6, wherein the n-type field effect transistor and the p-type field effect transistor are configured as a CMOS inverter.

8. The integrated circuit of claim 1, wherein the complementary metal oxide semiconductor (CMOS) devices include a field effect transistor, and wherein the gate is a single gate of the field effect transistor.

9. A method for providing a bias signal to a gate that is in a first CMOS cell of a multi-cell CMOS apparatus, from a first signal line that is at a frontside of a second CMOS cell of the multi-cell CMOS apparatus, the method comprising:

transmitting the bias signal along the first signal line to a gate contact at the frontside of the second CMOS cell;

transmitting the bias signal along the gate contact to a first via in the first CMOS cell;

transmitting the bias signal through the first via to a local interconnect at a backside of the first CMOS cell; and transmitting the bias signal along the local interconnect to a second via that is in contact with the gate.

10. A method for fabrication of an integrated circuit structure, the method comprising:

forming first and second vias in a first CMOS cell of complementary metal-oxide-semiconductor (CMOS) devices, wherein the second via connects to a gate in one of the CMOS devices;

forming, at a frontside of the first CMOS cell, a gate contact that bridges from the first via to a second CMOS cell of CMOS devices; and forming, at a backside of the first CMOS cell, a signal line that bridges from the first via to the second via.

11. The method of claim 10, further comprising:

forming the second via under the gate.

12. The method of claim 10, further comprising:

forming the first via in a diffusion break that is aligned to the gate contact.

13. A hardware description language (HDL) design structure encoded on a machine-readable data storage medium, the HDL design structure comprising elements that when processed in a computer-aided design system generates a machine-executable representation of an integrated circuit, wherein the HDL design structure comprises:

a first CMOS cell of complementary metal oxide semiconductor (CMOS) devices, with a first row of gate cuts and a second row of gate cuts that bound the first CMOS cell;

a gate associated with at least one of the CMOS devices in the first CMOS cell;

a first signal line at a frontside of the integrated circuit;

a signal connection from the first signal line to a backside of the integrated circuit; and a local interconnect at the backside of the integrated circuit from the signal connection to the gate.

14. The hardware description language (HDL) design structure of claim 13, wherein the integrated circuit further comprises:

a second CMOS cell of CMOS devices, which is bounded by the second row of gate cuts, wherein the first signal line extends along the frontside of the second CMOS cell.

15. The hardware description language (HDL) design structure of claim 13, wherein the signal connection comprises a first via in the first CMOS cell that connects to the local interconnect and a gate contact that extends across the frontside of the first and second CMOS cells and connects the first signal line to the first via.

16. The hardware description language (HDL) design structure of claim 15, wherein the gate incorporates a second via that contacts the local interconnect.

17. The hardware description language (HDL) design structure of claim 15, further comprising a diffusion break that is aligned to the gate contact, wherein the first via is formed inside the diffusion break.

18. The hardware description language (HDL) design structure of claim 13, wherein the complementary metal oxide semiconductor (CMOS) devices include an n-type field effect transistor and a p-type field effect transistor, and wherein the gate is a common gate of the n-type field effect transistor and the p-type field effect transistor.

19. The hardware description language (HDL) design structure of claim 18, wherein the n-type field effect transistor and the p-type field effect transistor are configured as a CMOS inverter.

20. The hardware description language (HDL) design structure of claim 13, wherein the complementary metal oxide semiconductor (CMOS) devices include a field effect transistor, and wherein the gate is a single gate of the field effect transistor.

* * * * *